United States Patent
Perry et al.

(10) Patent No.: US 6,732,290 B1
(45) Date of Patent: May 4, 2004

(54) RECOVERY SYSTEM FOR RAID WRITE

(75) Inventors: David D. Perry, Santa Cruz, CA (US); Rush C. Manbert, San Jose, CA (US)

(73) Assignee: MTI Technology Corporation, Anaheim, CA (US)

( * ) Notice: Subject to any disclaimer, the term of this patent is extended or adjusted under 35 U.S.C. 154(b) by 508 days.

(21) Appl. No.: 09/718,647

(22) Filed: Nov. 22, 2000

(51) Int. Cl.⁷ ............................................... G06F 11/00
(52) U.S. Cl. ........................... 714/6; 714/800; 711/155
(58) Field of Search ...................... 714/6, 800; 711/155

(56) References Cited

U.S. PATENT DOCUMENTS

| | | | | |
|---|---|---|---|---|
| 5,734,814 A | * | 3/1998 | Corbin et al. | 711/114 |
| 5,774,643 A | * | 6/1998 | Lubbers et al. | 714/20 |
| 5,872,906 A | * | 2/1999 | Morita et al. | 714/6 |
| 6,128,762 A | * | 10/2000 | Jadav et al. | 714/6 |
| 6,151,641 A | * | 11/2000 | Herbert | 710/22 |
| 6,446,237 B1 | * | 9/2002 | Menon | 714/800 |
| 6,513,142 B1 | * | 1/2003 | Noya | 714/803 |
| 6,542,960 B1 | * | 4/2003 | Wong et al. | 711/114 |

* cited by examiner

Primary Examiner—Robert Beausoliel
Assistant Examiner—Emerson Puente
(74) Attorney, Agent, or Firm—Townsend and Townsend and Crew LLP

(57) ABSTRACT

A Read-Modify-Write operation in a RAID system is done by separating the writing of new data and the writing of new parity, so that they are not done in parallel. This allows recovery to be performed at all stages, without requiring the excessive use of non-volatile cache, and minimizing the amount of time a span has to be locked. The invention accomplishes this by allowing one of the recoveries to be a recovery to the old data, before the write, with a signal to the host that the write operation failed in such a recovery situation, requiring the host to resend the data. This speeds up the entire operation while minimizing the use of resources while only requiring that in the rare instances of a failure during a particular part of the Read-Modify-Write, the host needs to resend the data.

8 Claims, 3 Drawing Sheets

RECOVERY SYSTEM FOR RAID WRITE

BACKGROUND OF THE INVENTION

The present invention relates to redundant arrays of independent disks (RAID), and in particular to systems for recovery from a failure during a write operation.

RAID systems allow data to be written in stripes across multiple disk drives. When the data is written, parity data is written on the last disk drive, or in some RAID systems on two additional disk drives. The parity data is a combination, such as by exclusive-ORing the data on the other disks together. By storing this parity data, error recovery can be accomplished if one of the data drives fails or is removed. Using the parity data and the remaining data on the other disk drives, the data from the failing disk drive can be regenerated.

When new data is written to only one or a few of the disks in a stripe of disk drives, a Read-Modify-Write operation is necessary. The read operation reads all disks from the disk drives and parity. The modify operation writes over one or more of the disks with the new data and calculates a new parity. The write operation then writes the newly calculated data and parity back onto the disk drives. In the event of a failure during this operation, it is necessary to take appropriate steps to avoid the loss of data.

One step to avoid conflicts is to lock out the span of disk drives being read, so that another operation does not attempt to read or modify the data in that span while the Read-Modify-Write operation is proceeding. In addition, a cache is typically used to store the old and new data so that upon a failure during the operation, the data is still available for performing the operation. For example, the old data can be maintained in cache while the new data is being written to ensure that it is available in case of a failure during a write.

In a typical operation, both the data and the parity are written in parallel to the multiple disk drives. Until the write is completed, the RAID controller cannot tell the host system that the operation has been completed. In order to improve speed, some systems use what is called an "early commit." This means telling the host system that the write has been completed, before it has actually been completed. Such an early commit is possible only if the appropriate data has been saved in cache or otherwise to allow completion of the operation in the event of a failure during the write operation. There are a number of reasons for using an early commit. For example, another operation may be using the parity drive ahead of this particular Read-Modify-Write, thus causing further delay in the actual write, which is avoided by an early commit.

It would be desirable to minimize use of non-volatile cache for an extended period of time to save data for error recovery. It would also be desirable to minimize the amount of time before the write controller can tell the host that the write has been completed. In addition, it would be desirable to minimize the amount of time a span of disk drives needs to be locked off from other operations.

SUMMARY OF THE INVENTION

The present invention improves upon the prior art Read-Modify-Write operation to achieve the above desirable objectives. This is done by separating the writing of new data and the writing of new parity, so that they are not done in parallel. This allows recovery to be performed at all stages, without requiring the excessive use of non-volatile cache, and minimizing the amount of time a span has to be locked. The invention accomplishes this by allowing one of the recoveries to be a recovery to the old data, before the write, with a signal to the host that the write operation failed in such a recovery situation, requiring the host to resend the data. This speeds up the entire operation while minimizing the use of resources while only requiring that in the rare instances of a failure during a particular part of the Read-Modify-Write, the host needs to resend the data.

In one embodiment, the new data is written before the new parity is written. In the event of a failure during the writing of the new data, the recovery is the writing of old data. In the event of a failure during the writing of the parity, the recovery can write the new parity again. Thus, only a failure during the writing of the new data requires a recovery with a write failure sent back to the host.

An alternate embodiment can have the new parity written before the writing of new data.

In addition, rather than locking the span starting from the reading of the old data and old parity, the present invention only requires the span to be locked after the new parity is calculated (and before the new data and new parity is written) until after the writing of the new parity and new data.

For a further understanding of the nature and advantages of the invention, reference should be made to the following description taken in conjunction with the accompanying drawings.

DESCRIPTION OF THE SPECIFIC EMBODIMENTS

Figure 1:
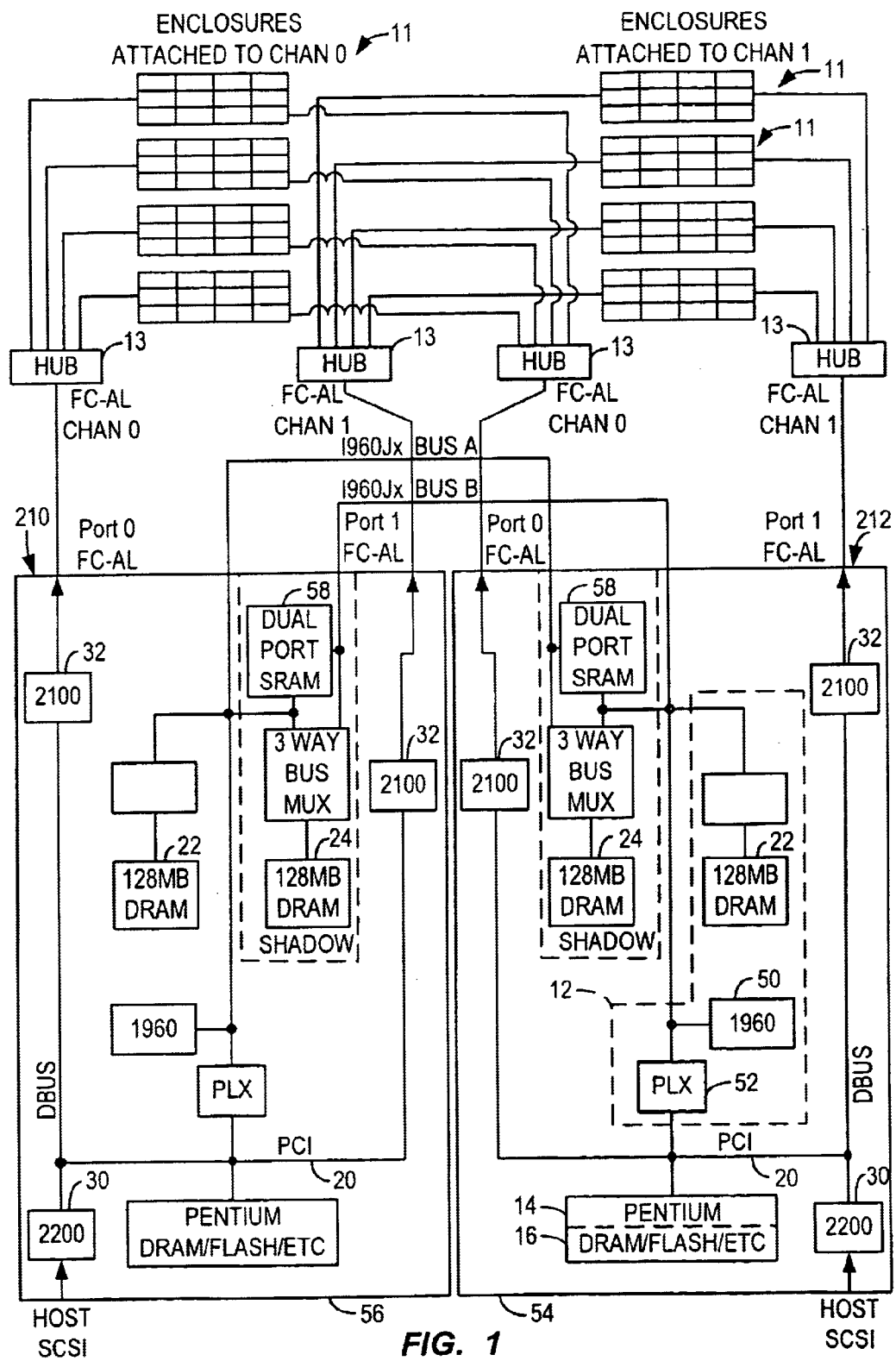
FIG. 1 is an overall diagram of a RAID system showing dual controllers for performing the method of the present invention.

FIG. 1 is an overall diagram of a RAID system including dual controllers which performs the method of the present invention. A number of RAID enclosures 11 are shown, each having 12 disk drives in this example. Four hubs 13 are shown connecting them through fibre channels to dual controllers 210 and 212. The other side of the controllers are connected to a host via interface circuits 30.

Each controller operates under the control of microprocessor 14, with associated memory 16. A bus 20 provides a connection to both the host interface and an interface 32 to the fibre channels to the hubs. Data is staged in a buffer memory 22. A redundant shadow memory is used in each controller to provide redundancy in the event of a failure of the other controller, shown as DRAM 24 and a dual port SRAM 58.

The actual RAID functions, such as a Read-Modify-Write, are done by a RAID engine controller 50. Microprocessor 14 is used to perform program operations, with the particular operation code being transmitted across PCI bus 20 through PLX interface 52 to controller 50. In addition to the DRAM 22, the dual port SRAM provides a non-volatile cache. During a Read-Modify-Write operation in the prior art, large portions of the data would be stored in the SRAM 58 in the event of a failure of a disk drive at some point in the process.

Figure 2:
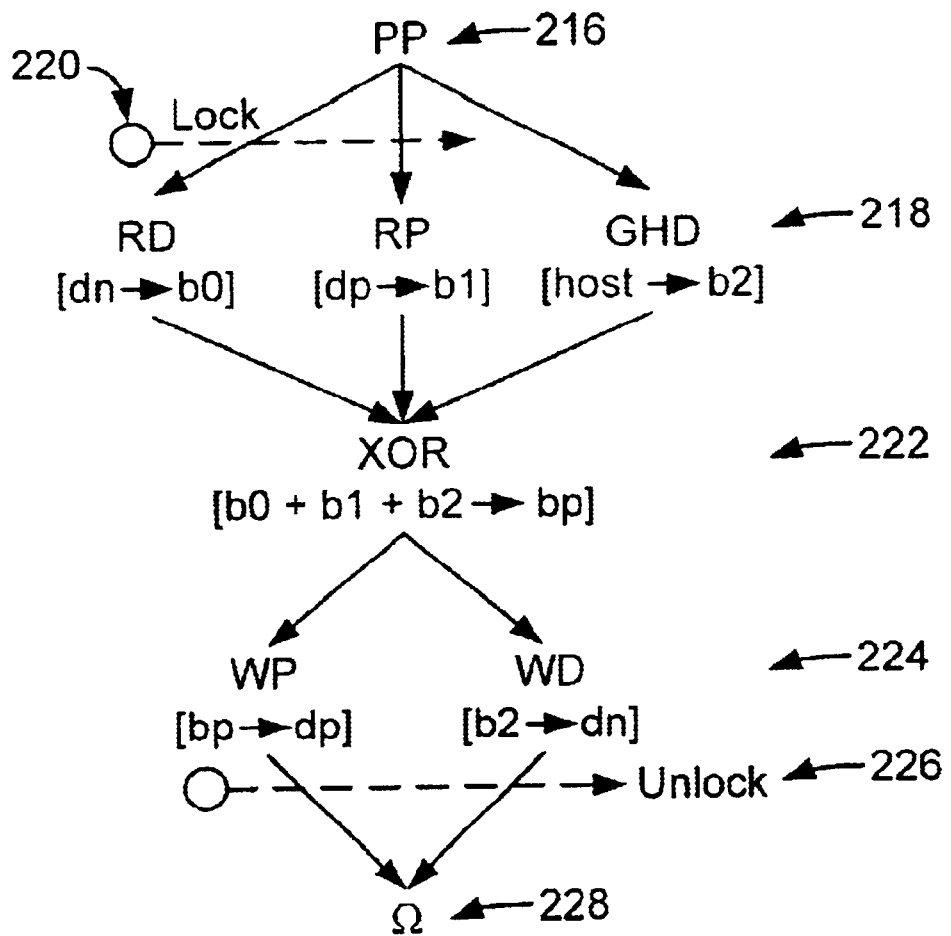
FIG. 2 is a diagram illustrating a prior art Read-Modify-Write operation.

FIG. 2 illustrates a prior art Read-Modify-Write operation. More details of this can be found in U.S. Pat. No. 5,860,003, incorporated herein by reference. FIG. 2 first shows a pre-processing step (PP) 216. After the pre-processing, three operations 218 are performed in parallel. First, the data is read from the disk drives (RD). At the same time, the parity disk drive is read in a read parity (RP) operation. At the same time, the data to be written as delivered by the host is gathered, in a gather host data (GHD) operation.

As noted in FIG. 2, a span lock is put in place at a point 220, before the read operations 218. This lock prevents other operations from accessing the same span of the disk drives being used for this Read-Modify-Write.

After step 218, the new and old data are exclusive ORed together (XOR) in step 222 to generate the new parity data. Next, at point 224, the new parity is written in a write parity operation (WP), in parallel with the writing of the new data (WD). After these writes, the span is unlocked at a point 226 to allow other operations to continue. Finally, a post-processing step 228 is performed.

Figure 3:
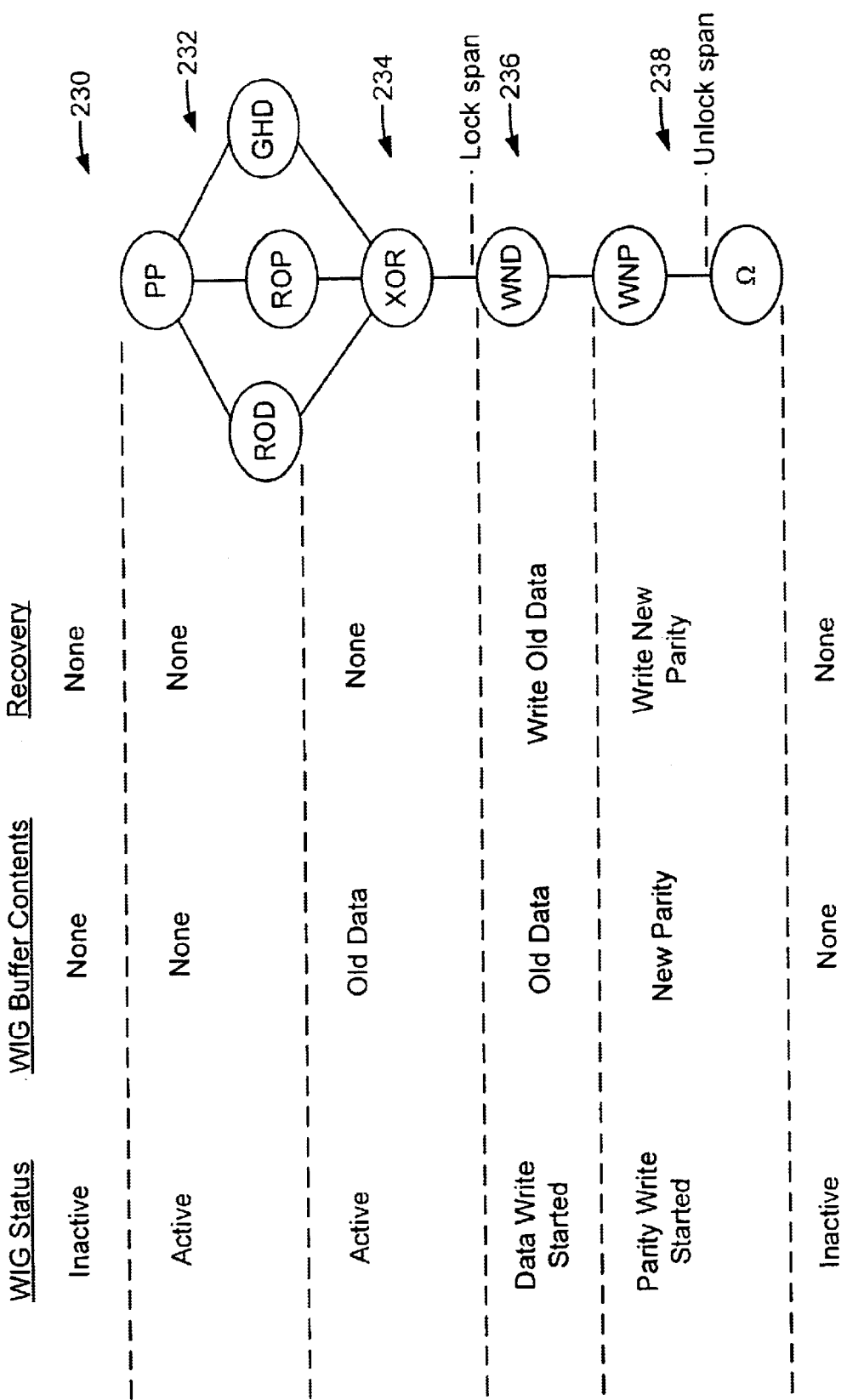
FIG. 3 is a diagram illustrating a Read-Modify-Write operation according to the present invention, with the accompanying recovery actions.

FIG. 3 is a diagram illustrating a Read-Modify-Write according to the present invention. In addition to the steps of the process being shown, the three columns on the left show WIG status, WIG buffer contents and recovery. The Write Integrity Guard (WIG) indicates a section of memory used to indicate status during a span lock. Included in the WIG are the storage area (which array) the start location (how many sectors down from the beginning) and the size of the span. In addition, the invention adds a status field. This allows a determination of what recovery operation can be taken, as indicated in FIG. 3. As shown in FIG. 3, at a first point in time 230, the WIG status is inactive, there are no WIG buffer contents, and there is no recovery necessary or possible. At a point 232, the WIG status becomes active. The pre-processing steps are performed, and then the read old data (ROD), the read old parity (ROP) and the gather host data (GHD) steps are performed, as in the prior art of FIG. 2. There are no WIG buffer contents at this point, and no recovery option.

Next, at a point 234, the new parity is generated with an exclusive OR (XOR) operation. At this point, the WIG buffer contains the old data, but there is no recovery yet because no write has been attempted at the disk drives.

At a step 236, a write new data (WND) step is taken. At this point, the WIG status indicates data write started. The WIG buffer still contains the old data. Thus, if there is a failure at this point, the recovery is to write the old data from the WIG buffer back onto the disk drives. The host would then be told that the write was incomplete, and the new data needs to be resent.

At step 238, there is a write new parity (WNP) operation. At this point, the WIG status indicates that a parity write has started. The contents of the WIG buffer is the new parity. Thus, in the event of failure, the recovery operation is to write the new parity. After the post-processing, the WIG status becomes active with no buffer contents and no recovery.

As can be seen, the writing of new data and the writing of new parity is not done in parallel but rather serially. This allows a shortening of the time during which the span needs to be locked. The span lock can be done before WND, and unlocked after WNP. Thus, the time of a span being locked up is shortened. The present invention also allows an early commit such described above with respect to the prior art. This can be done after the WND operation, since there is an ability to write the new parity after the new data has been written, and thus a commit can be done at this point. Such an early commit does not require storing all of the data in the buffer, but simply storing the new parity in the buffer.

In an alternate embodiment, steps 236 and 238 could be reversed, with a new parity being written first, and then the new data being written. This also allows an early commit as step 238, but with the new data being in the WIG buffer, rather than in the new parity. This does, however, require more room in the buffer in the typical application in step 238.

As will be understood by those of skill in the art, the present invention may be embodied in other specific forms without departing from the essential characteristics thereof. Accordingly, the foregoing description is intended to be illustrative, but not limiting, of the scope of the invention which is set forth in the following claims.

What is claimed is:

1. A method for performing a read-modify-write in a RAID system having a plurality of disk drives, comprising:
   receiving new data from a host;
   reading old data from said disk drives;
   reading old parity from said disk drives;
   generating new parity from said old and new data;
   locking a span for said read-modify-write after said generating new parity from the old and new data;
   performing a first write to said disk drives of a first one of said new parity and said new data; and
   after said first write is complete, performing a second write to said disk drives of a second one of said new parity and said new data.

2. The method of claim 1 wherein:
   said first write is a write of said new data; and
   said second write is a write of said new parity.

3. The method of claim 2 further comprising, in the event of a failure during said first write of said new data, recovering by re-obtaining said new data from the host.

4. The method of claim 2 further comprising, in the event of a failure during said second write of new parity, recovering by rewriting said new parity.

5. The method of claim 1 wherein:
   said first write is a write of said new parity; and
   said second write is a write of said new data.

6. A method for performing a read-modify-write in a RAID system having a plurality of disk drives, comprising:
   receiving new data from a host;
   reading old data from said disk drives;
   reading old parity from said disk drives;
   generating new parity from said old and new data;
   performing a first write of said new data to said disk drives;
   after said first write is complete, performing a second write of said new parity to said disk drives;
   in the event of a failure during said first write of said new data, recovering by re-obtaining said new data from the host;
   in the event of a failure during said second write of new parity, recovering by rewriting said new parity.

7. A RAID controller coupled to a plurality of disk drives comprising:
   a host interface;
   a data bus coupled to said host interface;
   a data memory coupled to said data bus;

a processor coupled to said data memory;

a program memory coupled to said processor; and a program stored in said program memory, including instructions for receiving new data from said host, reading old data from said disk drives, reading old parity from said disk drives, generating new parity from said old and new data, performing a first write of a first one of said new parity and said new data to said disk drives, and after said first write is complete, performing a second write of a second one of said new parity and said new data to said disk drives, in the event of a failure during said first write of said new data, recovering by re-obtaining said new data from the host;

in the event of a failure during said second write of new parity, recovering by rewriting said new parity.

8. A RAID controller coupled to a plurality of disk drives comprising:

a host interface;

a data bus coupled to said host interface;

a data memory coupled to said data bus;

a processor coupled to said data memory;

a program memory coupled to said processor; and a program stored in said program memory, including instructions for
  receiving new data from said host,
  reading old data from said disk drives,
  reading old parity from said disk drives,
  generating new parity from said old and new data,
  performing a first write of a first one of said new parity and said new data to said disk drives, and
  after said first write is complete, performing a second write of a second one of said new parity and said new data to said disk drives, and
  locking a span for said read-modify-write after said generating new parity from the old and new data.

* * * * *